United States Patent
Akaike et al.

(10) Patent No.: US 7,139,286 B2
(45) Date of Patent: Nov. 21, 2006

(54) METHOD AND SYSTEM FOR INSERTION AND EXTRACTION OF OVERHEAD IN SONET/SDH

(75) Inventors: Hirotaka Akaike, Tokyo (JP); Nobuyuki Mizukoshi, Tokyo (JP)

(73) Assignee: Nec Electronics Corporation, Kanagawa (JP)

( * ) Notice: Subject to any disclaimer, the term of this patent is extended or adjusted under 35 U.S.C. 154(b) by 1001 days.

(21) Appl. No.: 10/107,765

(22) Filed: Mar. 27, 2002

(65) Prior Publication Data
US 2002/0141455 A1    Oct. 3, 2002

(30) Foreign Application Priority Data
Mar. 29, 2001    (JP)    ............... 2001-095822

(51) Int. Cl.
H04J 3/16        (2006.01)
H04L 12/28      (2006.01)
(52) U.S. Cl. .................... 370/466; 370/395.5
(58) Field of Classification Search ................ 370/535, 370/395.5, 395.51, 466–467, 474
See application file for complete search history.

(56) References Cited

U.S. PATENT DOCUMENTS

| | | | | |
|---|---|---|---|---|
| 6,188,692 B1 * | 2/2001 | Huscroft et al. | ....... | 370/395.51 |
| 6,502,197 B1 * | 12/2002 | Raza | .......................... | 713/400 |
| 6,665,265 B1 * | 12/2003 | Raza | .......................... | 370/231 |
| 6,693,919 B1 * | 2/2004 | Kameyama | .................. | 370/503 |
| 6,765,933 B1 * | 7/2004 | Michel et al. | .............. | 370/539 |
| 6,891,863 B1 * | 5/2005 | Penkler et al. | .............. | 370/539 |
| 2002/0015414 A1 * | 2/2002 | Badalucco et al. | ......... | 370/442 |
| 2003/0031204 A1 * | 2/2003 | Ho et al. | .................... | 370/471 |

FOREIGN PATENT DOCUMENTS

| | | |
|---|---|---|
| JP | 5-101009 | 4/1993 |
| JP | 2000-278235 | 10/2000 |

* cited by examiner

*Primary Examiner*—Ricky Q. Ngo
*Assistant Examiner*—Warner Wong
(74) *Attorney, Agent, or Firm*—Muirhead & Saturnelli, LLC

(57) ABSTRACT

An overhead insertion interface unit connected to a high-speed line via a frame processing unit includes a TOH FIFO, a POH FIFO, and a common gate for transmitting a TOH input request and a POH input request to an external device. Each of the FIFOs receives a TOHAV signal together with TOH data and POH data sequentially, and the frame processing unit performs insertion processing. Overhead extraction processing is performed by the reverse of the operations for insertion processing, using the frame processing unit and the overhead extraction interface unit.

16 Claims, 16 Drawing Sheets

METHOD AND SYSTEM FOR INSERTION AND EXTRACTION OF OVERHEAD IN SONET/SDH

BACKGROUND OF THE INVENTION

1. Field of the Invention

The present invention relates to a communication scheme and system equipped with an LSI device that provides an interface between a high-speed transmission line and a lower-speed device, and more particularly to a method and system for insertion and extraction of overhead in SONET/SDH (Synchronous Digital Hierarchy). The overhead is used on data transfer via a network as information for operation and administration of the network.

2. Description of the Prior Art

A conventional method and system for insertion and extraction of overhead in SONET or SDH have an LSI device in which every port has a frame-processing unit for interfacing to a high-speed line and an interface unit for interfacing to a lower-speed external device to perform insertion and extraction of the overhead present in a SONET/SDH frame; providing the LSI device with multiple ports has come to be an important issue. In particular, recent LSI devices have come to be highly functional, by performing numerous functions or having numerous channels, and communication capabilities are being implemented in a single IC.

Such an LSI device will now be described below; insertion and extraction of overhead will be described separately with reference to FIGS. 11 to 13 and FIGS. 14 to 16, respectively.

First, as shown in FIG. 11, for the STS-12c system, for example, an interface system that performs insertion of overhead has a frame processing unit 70 for processing frames in SONET/SDH. The frame processing unit 70 interfaces to a high-speed line. The interface system also has an overhead insertion interface unit 73 that interfaces to a lower-speed external device. The SONET/SDH frame processing unit 70 has a transport overhead (TOH) processor 71 for inserting overhead into a frame transmitted to the line and a path overhead (POH) processor 72; and the overhead insertion interface unit 73 has a TOH timing generator 74 that includes a function for generating timing for transmitting TOH data to the line, a function for generating timing for the external device to input TOH data, and a buffer function used in transmitting TOH data from the external device to the line; the overhead insertion interface unit 73 also has a POH timing generator 75 that generates timing for POH data in a way similar to the TOH timing generator 74.

The basic STS-1 SONET frame structure, transport overhead (TOH), and path overhead (POH) have been disclosed in JP-A-101009/1993 (FIGS. 3, 4, and 6) and other documents. The STS-3c system is a combination of three STS-1 systems, and STS-12c represents a frame size of a combination (concatenation) of four STS-3c systems; a detailed description will be omitted herein. The concatenation is well known, being disclosed in JP-A-278235/2000 and other documents.

Next, the operations of the interface system will be described. As shown in FIG. 11, when an A1-byte request pulse (a pulse for requesting the A1 byte allocated in the first row of overhead) is input as a frame timing pulse for establishing synchronization of frames from the frame processing unit 70 to the TOH timing generator 74 in the overhead insertion interface unit 73, the TOH timing generator outputs a TOH clock (TTOHCK) and a TOH framing pulse (TTOHFP) to the external device to request it to input 4-bit parallel TOH data (TTOH[3:0]), as shown in FIGS. 11 and 12. In FIG. 12, b1 in the TOH data (TTOH[3:0]) represents the first bit of each byte from A1 to Z0 in the first row of TOH in the frame; representations of the second to eighth bits are omitted. Since a TOH clock (5.184 MHz) is a frequency for inputting the 36 TOH bytes over a whole one-row span of overhead, the external device outputs a TOH enable signal (TTOHEN), plus 4-bit parallel TOH data, to the TOH timing generator 74 in synchronization with the TOH clock. As a result, the TOH timing generator 74 outputs TOH data to the frame processing unit 70, which inserts the TOH into the frame.

Similarly, as shown in FIG. 11, when a J1-byte request pulse, which is a pulse requesting the J1 byte that is a part of the path overhead (POH) and is allocated to the first byte of the payload, is input as a frame timing pulse from the frame processing unit 70 to the POH timing generator 75 in the overhead insertion interface unit 73, the POH timing generator 75 outputs a POH clock (TPOHCK) and a POH framing pulse (TPOHFP) to the external device to request it to input POH data (TPOH), as shown in FIGS. 11 and 13. In FIG. 13, b1 in the POH data represents the first bit of each byte from J1 to Z5 in the first column of POH in the frame; representations of the second to eighth bits are omitted. Since a POH clock (576 KHz) is a frequency for inputting the 1 POH byte over a whole one-byte span of overhead, the external device outputs the POH data in synchronization with the POH clock, together with a POH enable signal (TPOHEN), to the POH timing generator 75. As a result, the POH timing generator 75 outputs the POH data to the frame processing part 70, whereby the POH is inserted into the frame.

Next, as shown in FIG. 14, an interface system performing extraction of overhead is configured with circuits similar to those of the interface system shown in FIG. 11. More specifically, the interface system has a SONET/SDH frame processing part 80 that includes a transport overhead (TOH) processor 81 for interfacing to the high-speed line side to extract overhead from a frame received from the line and a path overhead (POH) processor 82, and an overhead extraction interface unit 83 for interfacing to a lower-speed external device. The overhead extraction interface unit 83 has a TOH timing generator 84 that includes a function for generating timing for receiving TOH data input from a line, a function for generating timing for outputting TOH data to the external device, and a buffer function used in receiving TOH data output from the line to the external device; and a POH timing generator 85 that generates timing for POH data in a way similar to the TOH timing generator 84.

Next, the operations of the interface unit will be described. As shown in FIG. 14, when an A1-byte pulse, which is a pulse requesting the A1 byte allocated to the first row of overhead, is input as a frame timing pulse for establishing synchronization of the frame from the SONET/SDH frame processing part 80 to the TOH timing generator 84 in the overhead extraction interface unit 83, the TOH timing generator 84 outputs a TOH clock (RTOHCK) and a TOH framing pulse (RTOHFP) to the external device, and receives TOH data from the frame processing unit 80, as shown in FIGS. 14 and 15. Since the TOH data is input and appears with fixed timing in every row, the TOH timing generator 84 receives it with the fixed timing in subsequent rows. In this example, two rows of TOH data can be stored and switched at every row. The TOH data is output as RTOH[3:0] from the TOH generator 84 to the external device. In FIG. 15, b1 in RTOH data [3:0] also represents a first bit of each byte from A1 to Z0 in the first row of TOH in the frame; representations of the second to eighth bits are omitted. TOH clock (5.184 MHz) is a frequency for outputting the 36 TOH bytes over a whole one-row span of overhead, so the TOH timing generator 84 outputs 4-bit parallel TOH data to the external device in synchronization with the TOH clock.

As a result, TOH data is output from the frame processing unit 80 to the TOH timing generator 84, whereby the overhead is extracted from the frame.

Similarly, as shown in FIG. 14, when a J1-byte pulse, which is a pulse requesting the J1 byte that is a part of the path overhead (POH) and is allocated to the first byte of the payload, is input as a frame timing pulse from the frame processing unit 80 to the POH timing generator 85 in the overhead extraction interface unit 83, the POH timing generator 85 outputs a POH clock (RPOHCK) and a POH framing pulse (RPOHFP) to the external device, together with POH data (RPOH), as shown in FIGS. 14 and 16. In FIG. 16, b1 in the POH data (RPOH) represents the first bit of each byte from J1 to Z5 in the first column of POH; representations of the second to eighth bits are omitted.

As a result, POH data is output from the frame processing unit 80 to the POH timing generator 85, whereby the POH is extracted from the frame.

In the TOH clock and POH clock transmitted from the overhead insertion interface unit 73 and the overhead extraction interface unit 83 to the external device, a blank span (shown in FIGS. 1, 2, 13, 15, and 16) indicates an idle span. That is, request data or valid data is indicated only by the clock.

The aforementioned conventional SONET/SDH overhead insertion and extraction method and system place TOH overhead data (each byte) at a fixed location in a frame, thereby enabling periodic insertion and extraction of TOH. In contrast to TOH overhead data, however, POH overhead data (each byte) is not placed at a fixed location. This is because byte J1 in the POH, which indicates the location where the Synchronous Payload Envelope (SPE) begins, is dynamically designated by a pointer contained in the TOH. Therefore, a phase difference arises between overhead data in TOH and overhead data in POH, so the TOH and POH must be inserted into and extracted from a frame with different timing. Accordingly, the overhead insertion and extraction interface units must handle TOH and POH separately. That is, these interface units must be provided separately.

As described above, the conventional overhead insertion and extraction method and system must provide separate terminals for TOH and POH, so each port, including the ports of an interface system, must have more terminals, a drawback that prevents the number of ports per LSI device from being increased.

In addition, the conventional overhead insertion and extraction method and system perform processing of transport overhead and path overhead separately, thus present a drawback that it cannot adjust frequencies on the overhead transmitting side, or the insertion interface unit.

Furthermore, the conventional overhead insertion and extraction method and system must provide a number of POH interface units equal to the number of channels supported to realize multi-channel frame, increasing the number of terminals, raising the unwelcome problem of whether to increase the size of the LSI device to accommodate the plurality of ports or decrease the number of ports that can be accommodated in an LSI device.

BRIEF SUMMARY OF THE INVENTION

Objects of the Invention

The major object of the present invention is to provide a SONET/SDH overhead insertion and extraction method and system that can reduce the number of terminals per port of the LSI device used, and accordingly can provide more ports.

Another object of the present invention is to provide a SONET/SDH overhead insertion and extraction method and system that can adjust frequencies of the overhead transmitting side interface unit.

Another object of the present invention is to provide a SONET/SDH overhead insertion and extraction method and system that can also reduce the number of terminals of POH interface of each channel in a multi-channel frame and achieve small size and multiple ports of LSI devices.

SUMMARY OF THE INVENTION

According to the invented SONET/SDH overhead insertion and extraction method and system, in the TC sublayer (transmission convergence sublayer) that forms a SONET/SDH-based physical layer and adjusts speed of cells, in other words, in the LSI device that interfaces between a high-speed transmission line and a lower-speed external device, insertion and extraction of transport overhead (TOH) and path overhead (POH) in a SONET/SDH frame transmitted to and from the external device is performed by sharing an interface to the external device, thereby reducing the number of the terminals and making it easier to increase the number of ports. In short, the present invention can limit the increase in the number of terminals when increasing the number of ports of the LSI device.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Embodiment of the present invention will now be described with reference to the attached drawings. The present invention will be briefly described with reference to FIG. 1; a frame structure will be described with reference to FIG. 2; a first embodiment will be described with reference to FIGS. 3 to 6; and a second embodiment will be described with reference to FIGS. 7 to 10.

Figure 1:
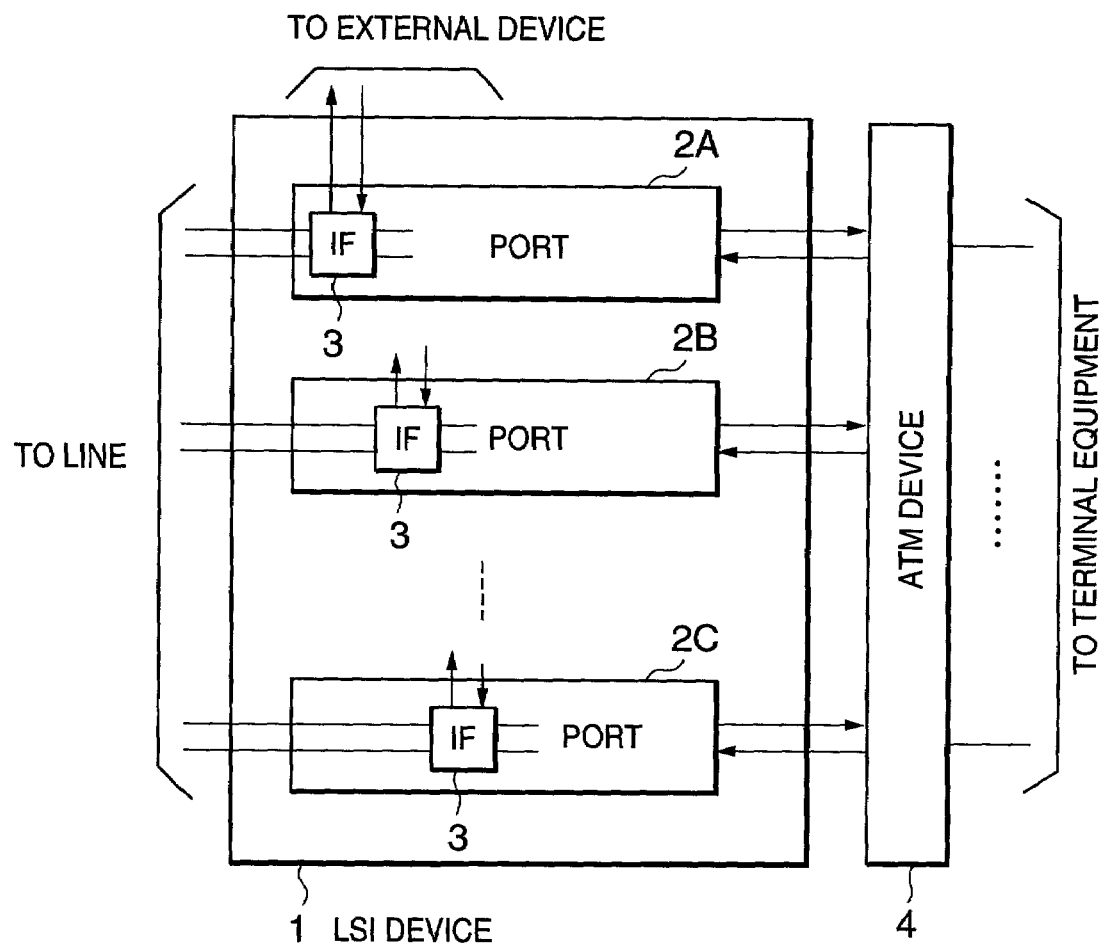
FIG. 1 is a block diagram of a switching system for brief description of the present invention.

FIG. 1 is a block diagram of a switching system for briefly describing the present invention. As shown in FIG. 1, the switching system is connected to an ATM device via high-speed transmission lines such as 622-Mbps optical fiber cables, and includes an LSI device 1 that interfaces to a lower-speed external device and an ATM device 4 that performs ATM processing via a plurality of ports 2A to 2C provided in the LSI device 1, one port per line, to transmit and receive data to and from personal computers and other terminals. The LSI device 1 has an interface unit (IF) 3 in each port that interfaces between the line side and an external device side, and provides functions of inserting overhead information to SONET/SDH frames transmitted to the line and extracting overhead information from SONET/SDH frames received from the line. The external devices include devices with lower-speed processing capabilities unlike the LSI device 1, while the LSI device 1 requires at least as many terminals as there are ports. The interface unit (IF) 3 provided in the LSI device 1 makes it possible to interface between the high-speed line side and lower-speed external device and input and output data in accordance with the timing of both.

Figure 2:
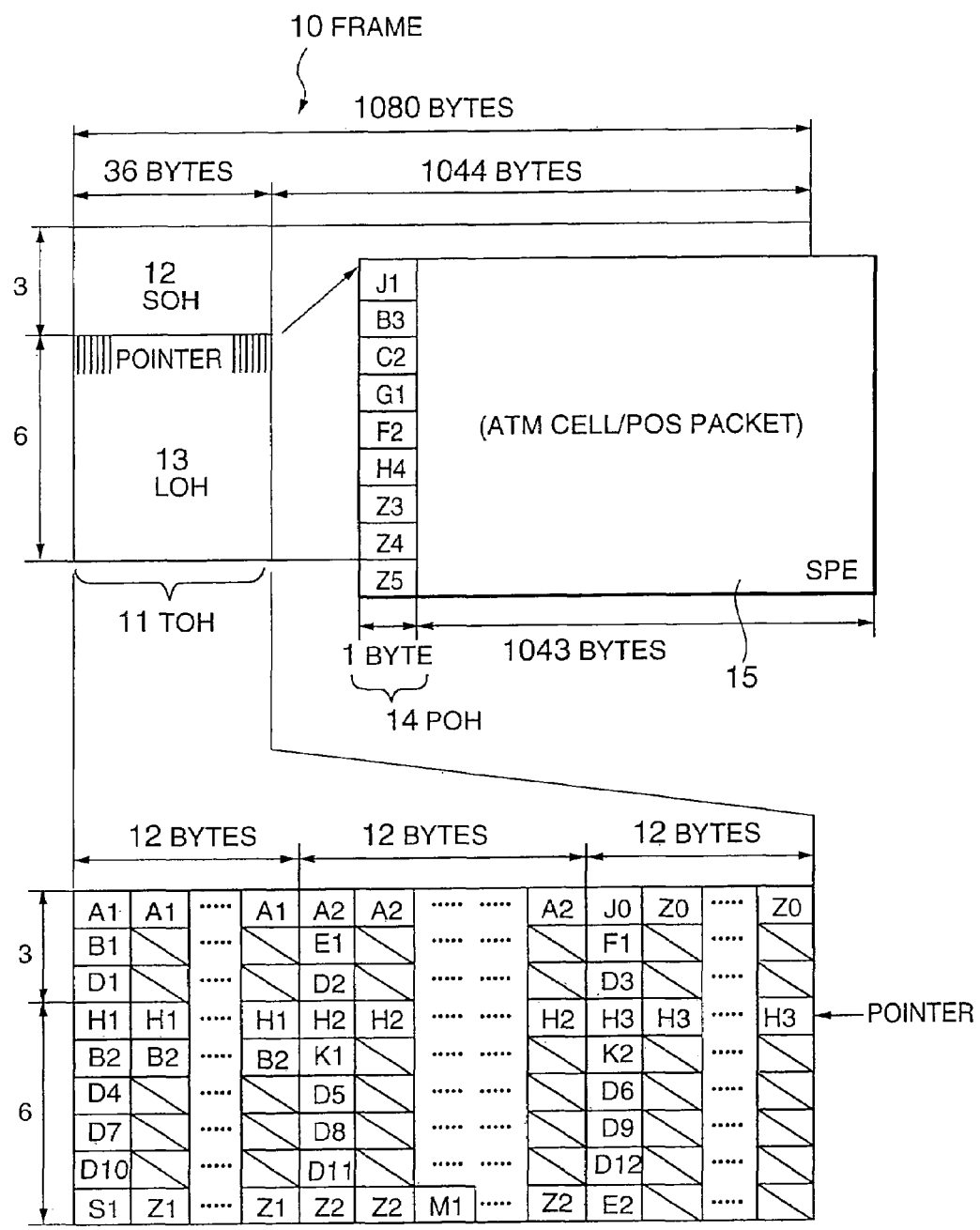
FIG. 2 is a diagram showing the structure of a data frame transmitted in the system shown in FIG. 1.

FIG. 2 is a diagram of the structure of a data frame transmitted by the system shown in FIG. 1. As shown in FIG. 2, the format of the data frame transmitted to the line is that of an STS-12c transmitting frame 10, but it can also apply to STS-12c receiving frames, and STS-1, STS-3c, and other frames.

The frame 10 is mainly composed of a transport overhead (TOH) 11, a path overhead (POH) 14, and a Synchronous Payload Envelope (SPE) 15; the TOH 11 includes section overhead (SOH) 12 and line overhead (LOH) 13; and a pointer is placed on the first line of the LOH 13. The STS-12c frame 10 is composed of 1080 bytes wide by 9 rows as a whole, and transmission and reception of the frame are performed from the most significant bit (MSB) of A1 byte in the first row, in the row direction, and repeated times the number of rows, or nine times (622 Mbps).

The TOH 11 is composed of overhead indicating information of the frame 10, and is depicted as a rectangle of 9 rows, each 36 bytes. A pointer placed on the first row of the LOH 13 in the TOH 11 points to the location of the POH 14 (the location of the first J1 byte), thereby enabling multiplexing of the SPE 15.

The SPE 15 is composed of 1043 bytes by 9 rows of payload data, into which ATM cells or POS packets are packed. An ATM cell is 53 bytes long (fixed length), so a maximum of 170-cells of information can be packed in the SPE 15. The POH 14 is composed of overhead indicating payload information of the SPE 15, and contains one byte in a row, thus 9 bytes in total.

Figure 4:
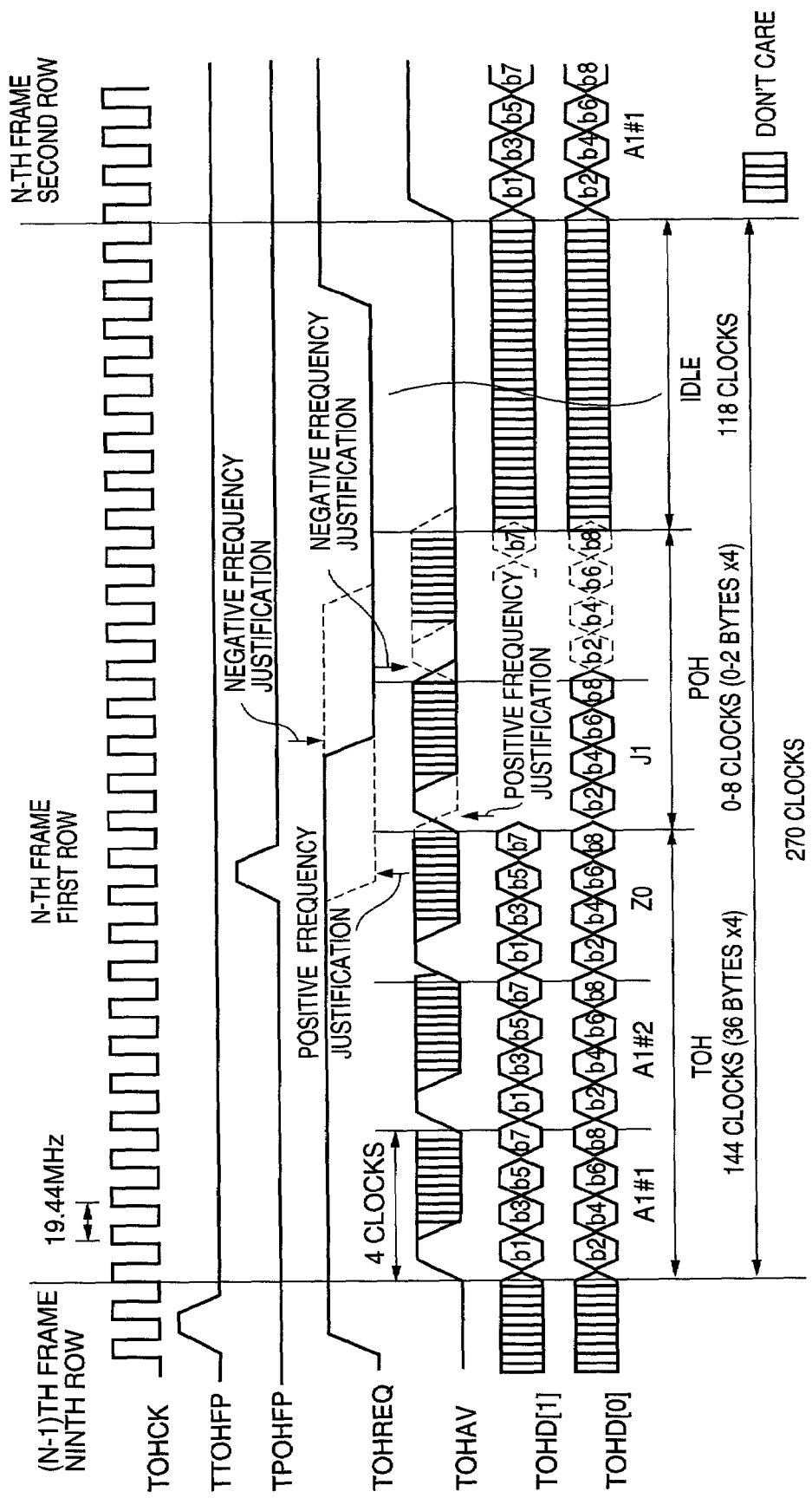
FIG. 4 is a timing diagram of various signals and data, describing overhead insertion operations in the system shown in FIG. 3.
Figure 6:
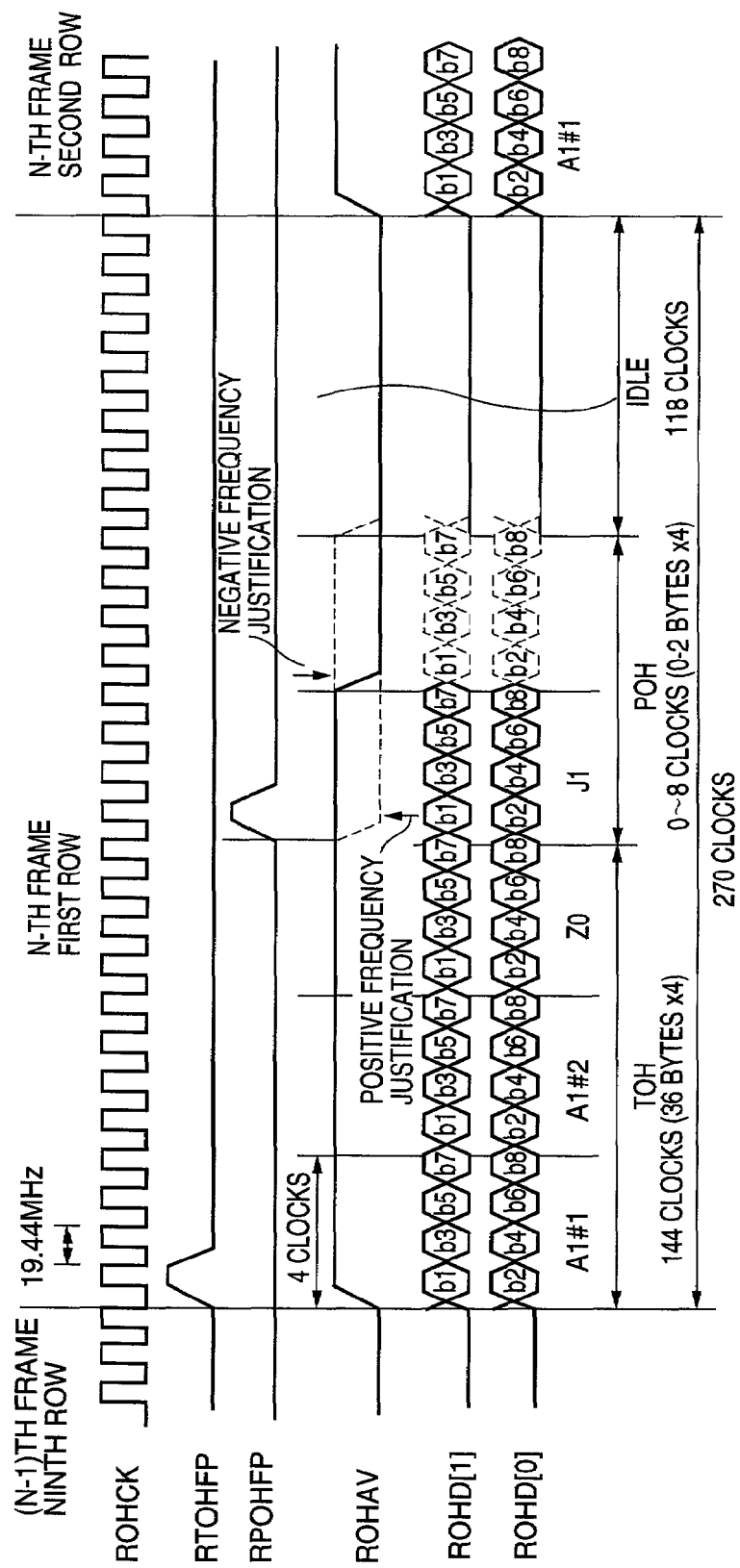
FIG. 6 is a timing diagram of various signals and data, describing overhead extraction operations in the system shown in FIG. 5.
Figure 11:
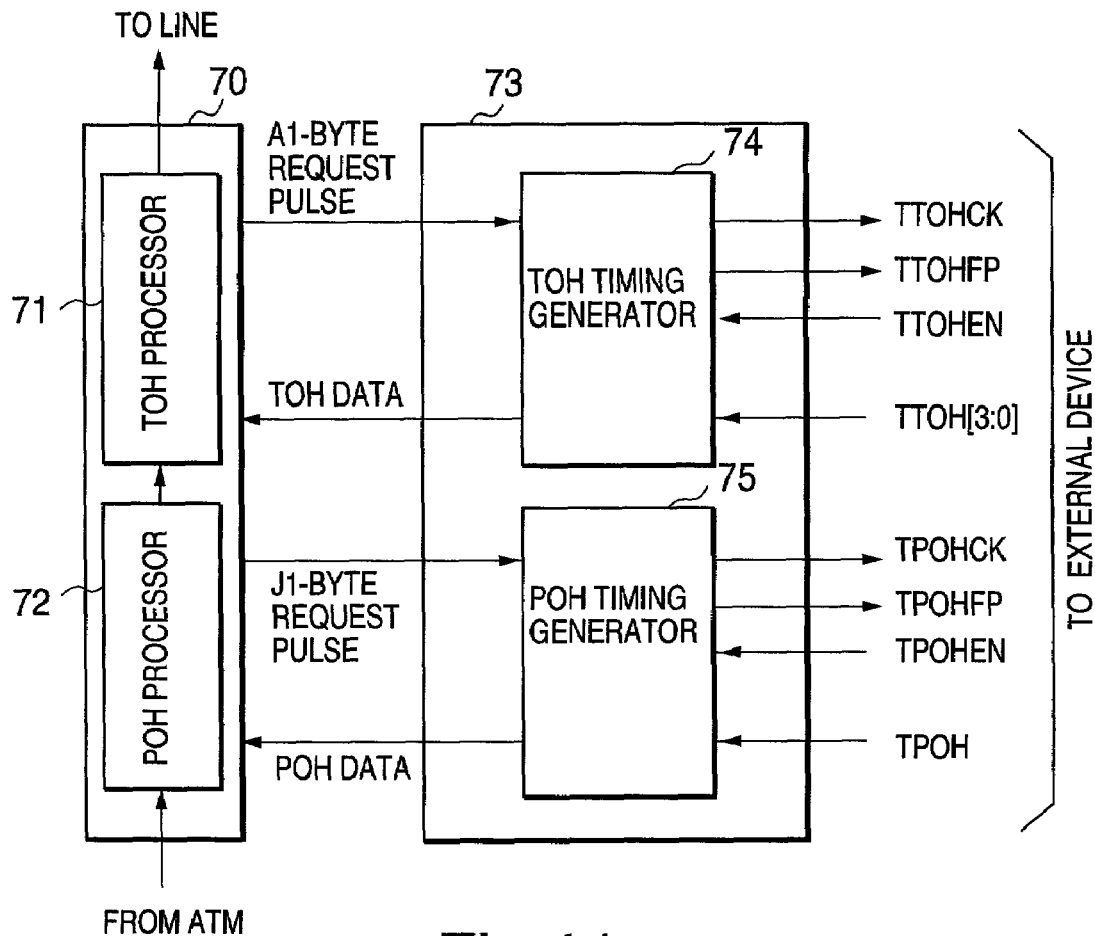
FIG. 11 is a block diagram of an interface unit performing insertion of overhead, describing a prior art.
Figure 12:
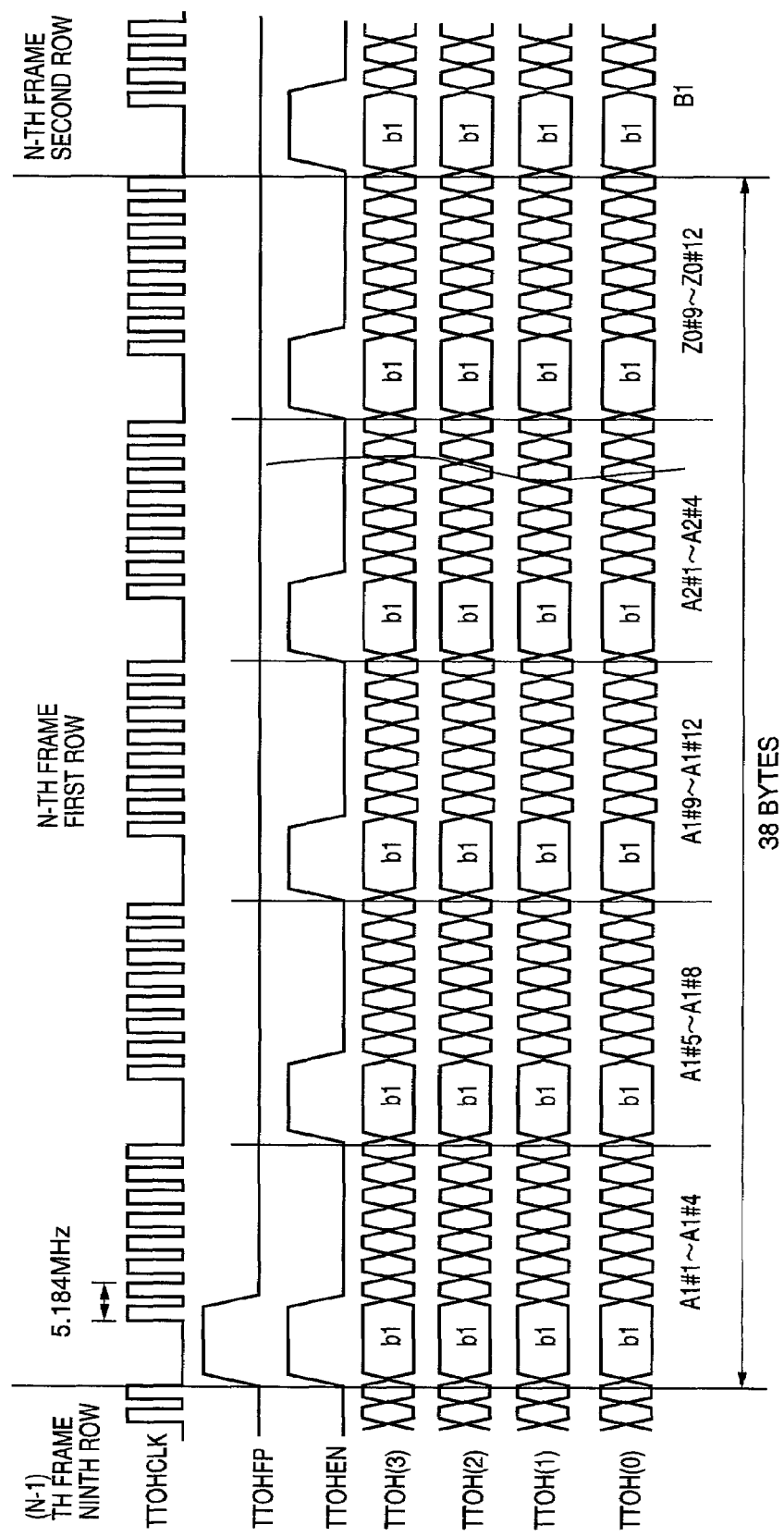
FIG. 12 is a timing diagram of various signals and data used in the TOH insertion interface shown in FIG. 11.
Figure 13:
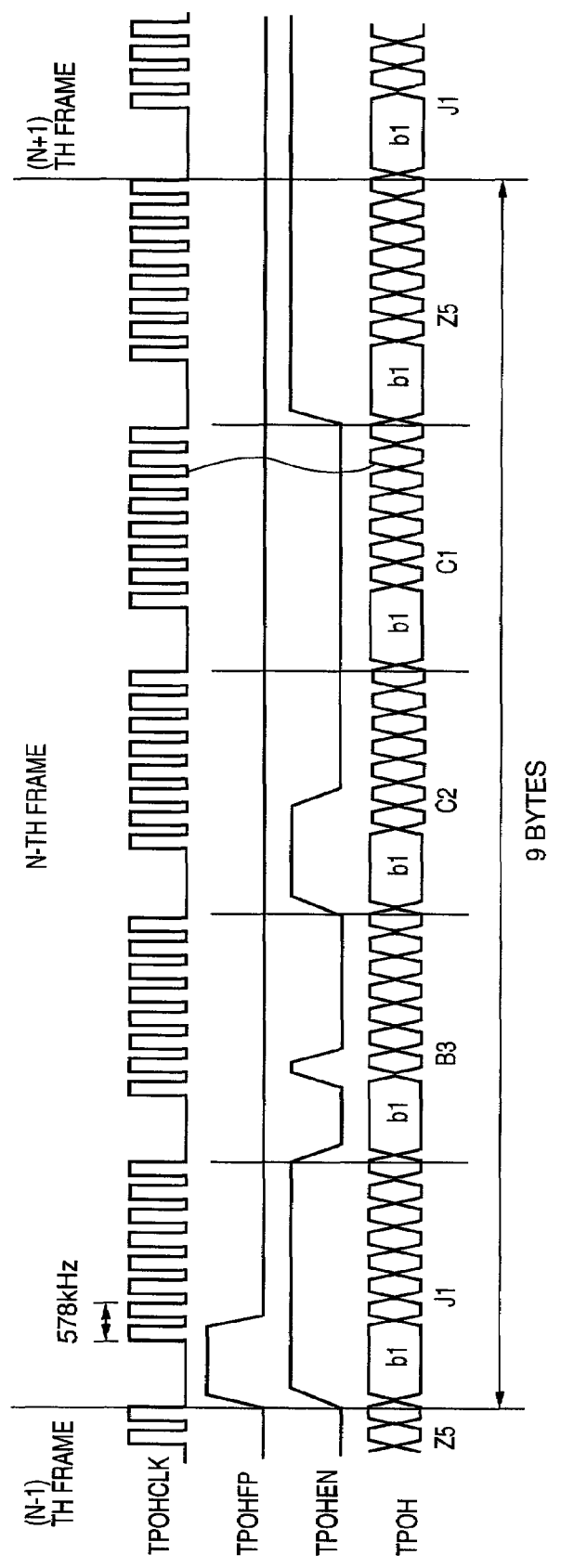
FIG. 13 is a timing diagram of various signals and data used in the POH insertion interface shown in FIG. 11.
Figure 14:
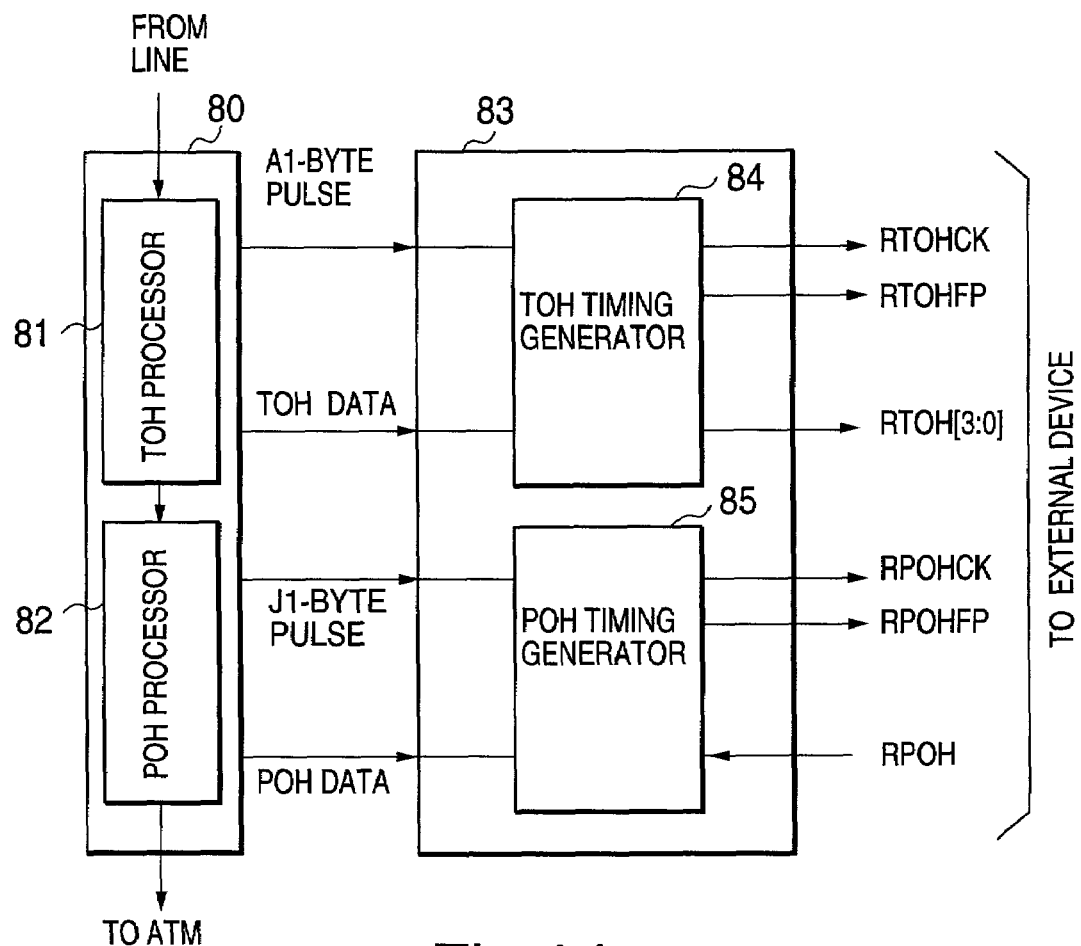
FIG. 14 is a block diagram of an interface unit performing extraction of overhead, describing the prior art.
Figure 15:
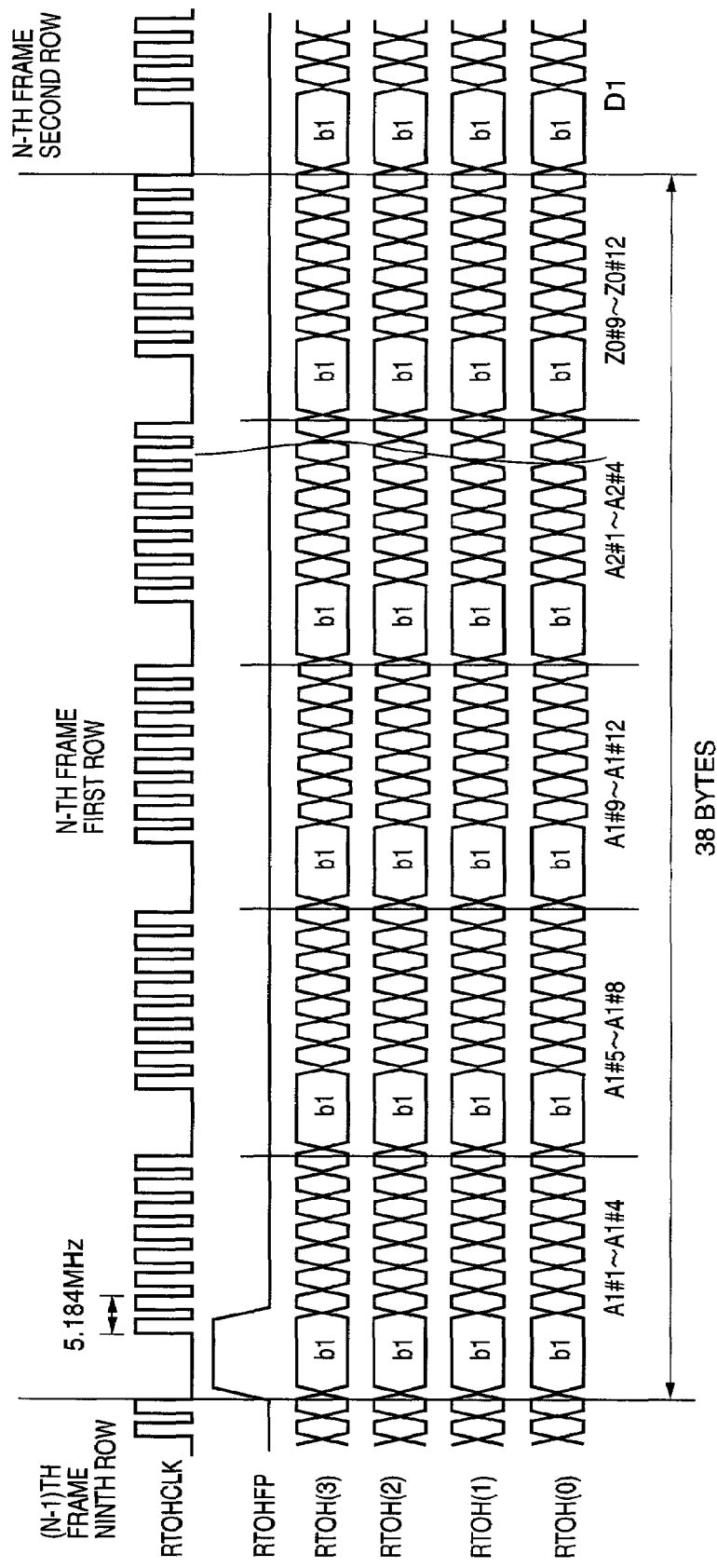
FIG. 15 is a timing diagram of various signals and data used in the TOH extraction interface shown in FIG. 14.
Figure 16:
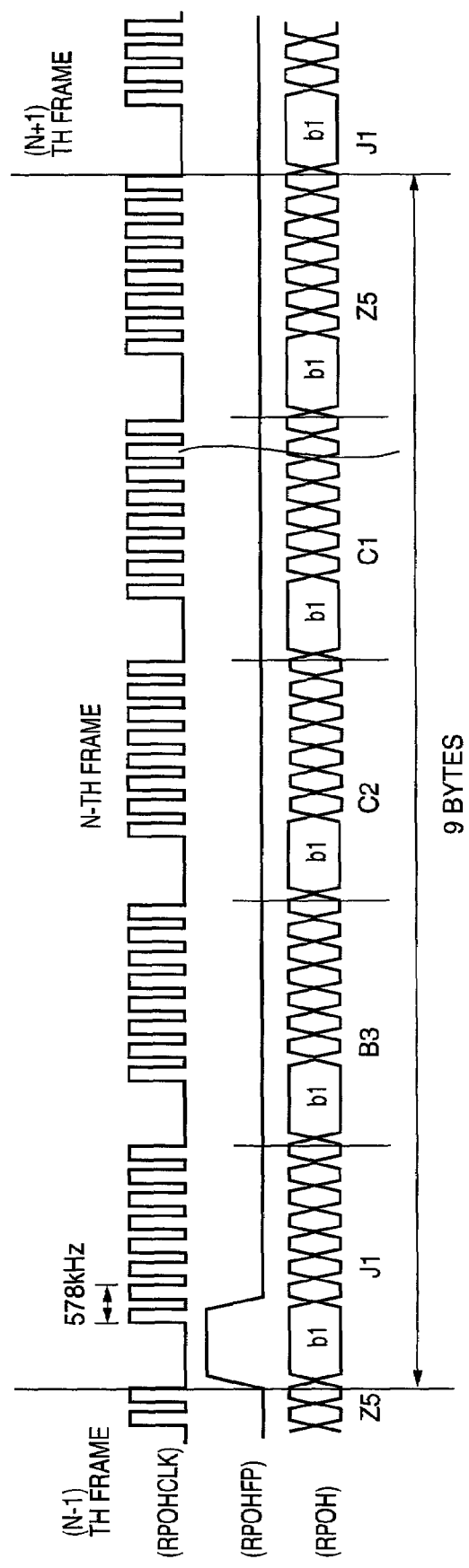
FIG. 16 is a timing diagram of various signals and data used in the POH insertion interface shown in FIG. 14.

The basic structures of the transport overhead (TOH) 11 and the path overhead (POH) 14 in the STS-12c system are the same as those of the TOH and POH shown in FIGS. 4 and 6 in the document (JP-A-101009/1993) concerning an STS-1 system that has been described in relation to the prior art (FIG. 11).

The interface unit (IF) 3 shown in FIG. 1 extracts the TOH 11 and POH 14 to the external device on reception of a frame with said structure, and inserts these overheads from the external device for transmitting the frame. Therefore, the POH 14 requires an interface performing insertion and extraction of 36 bytes per row for the TOH 11 and 9 bytes per frame.

Figure 3:
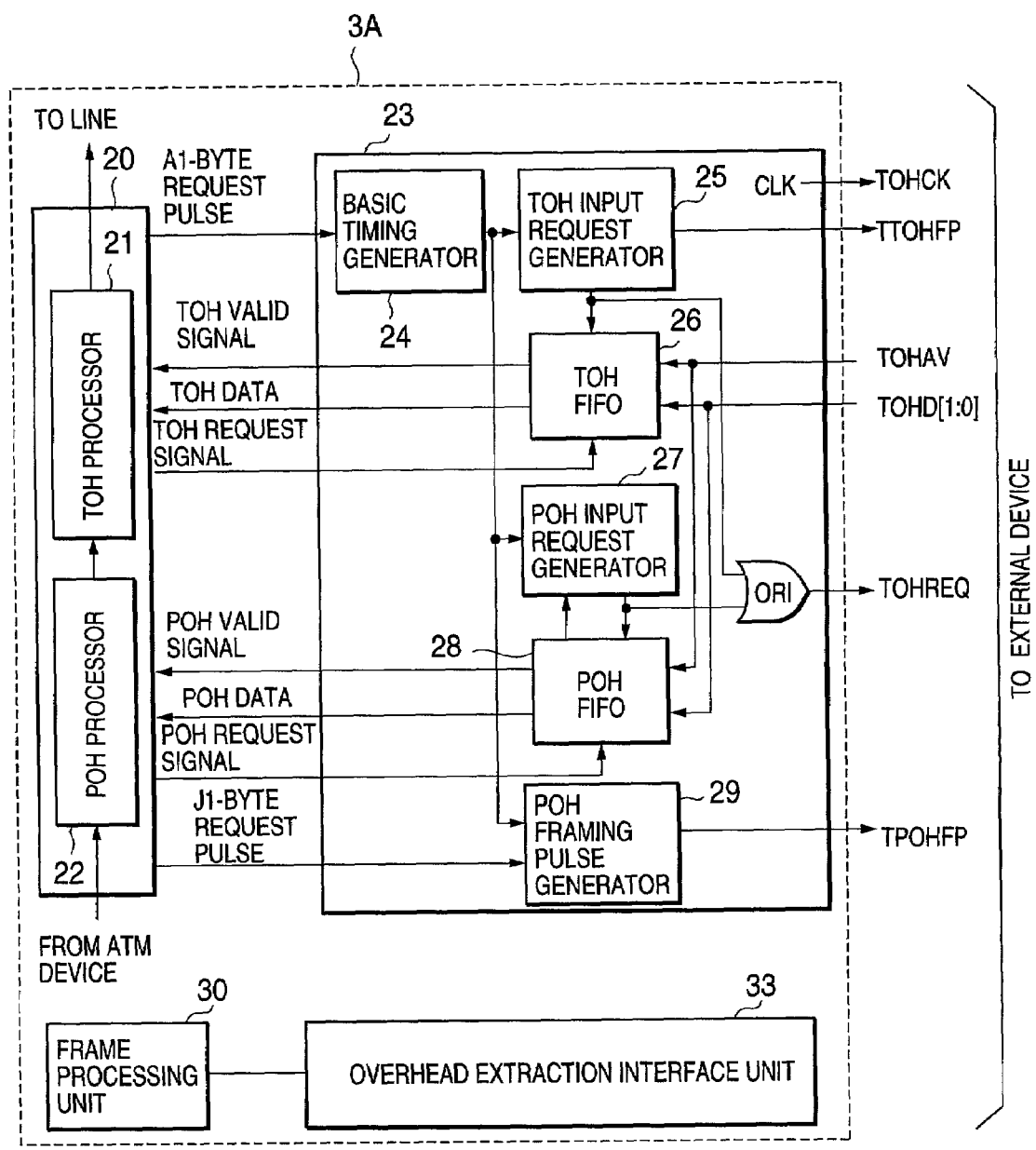
FIG. 3 is a block diagram of an interface system, mainly describing the insertion of frame overhead according to a first embodiment of the present invention.

FIG. 3 is a block diagram of an interface unit for mainly describing insertion of overhead of a frame according to the first embodiment of the present invention. As shown in FIG. 3, an interface unit (IF) 3A of the first embodiment has a frame processing unit 20 that performs frame processing to insert overhead into a high-speed line; an overhead insertion interface unit 23 that requests overhead data for inserting overhead to a lower-speed external device; a frame processing unit 30 for extracting overhead to a frame from the high-speed line; and an overhead extraction interface unit 33 that requests overhead data for extracting overhead to the lower-speed external device. The extraction of overhead will be described later with reference to FIG. 5, so the insertion of overhead will now be described.

The overhead insertion interface unit 23 in the interface system 3A includes a basic timing generator 24 that generates basic timing in response to an A1-byte request pulse as a frame timing pulse; a TOH input request generator 25 that generates and outputs a TOH framing pulse (TTOHFP) to the external device in response to a timing signal output from the basic timing generator 24; a POH input request generator 27 that generates an input request to the external device in response to a timing output from the basic timing generator 24; a POH framing pulse generator 29 that generates a POH framing pulse (TPOHFP) to the external device in response to a J1-byte request pulse as a frame timing pulse and a timing signal output from the basic timing generator 24; an OR gate (OR1) that outputs an overhead request signal (TOHREQ) to the external device in response to a request output of either the TOH input request generator 25 or the POH input request generator 27; TOHFIFO 26 that receives an overhead valid signal (TOHAV) and overhead data (TOHD[1:0]) sequentially from the external device in response to a TOH request signal from the frame processing unit 20 and a TOH request from the TOH input request generator 25, and transfers the TOH valid signal and the TOH data to the frame processing unit 20; and POHFIFO 28 that receives an overhead valid signal (TOHAV) and overhead data (TOHD [1:0]) sequentially from the external device in response to a POH request signal from the frame processing unit 20 and a POH request from the POH input request generator 27, and transfers the POH valid signal and the POH data to the frame processing unit 20. In short, the overhead insertion interface unit 23 provides a common insertion control terminal and a common insertion data terminal for transferring TOH and POH insertion control signals and insertion data to and from the external device.

The overhead insertion interface unit 23 transmits an internal operating clock (CLK) 19.44 MHz that is generated by dividing the line transmission rate 622 MHz by a factor of 32 as an overhead clock (TOHCK) to the external device.

As described above, this embodiment transmits a TOH input request and a POH input request signal to the external device via OR1, thereby enabling sharing of the overhead request signal terminal, and provides TOHFIFO 26 and POHFIFO 28, thereby sharing the overhead valid signal (TOHAV) terminal and the overhead data (TOHD [1:0]) terminal from the external device.

FIG. 4 is a timing diagram of various signals and data for describing overhead insertion operations in the system shown in FIG. 3. As shown in FIG. 4, one STS12c frame is transmitted every 125 μs (=1080 bytes×8 bits×9 rows/622 MHz). As stated above, assuming that the internal operating clock (TOHCK) is 19.44 MHz, one row of the frame has to be processed in 270 clocks (=19.44 MHz×125 μs/9 rows).

Since the overhead inserted into one frame includes 36 TOH bytes and 0 to 2 POH bytes per row, the overhead is input from the external device at a 2-bit terminal. This makes the input timing last 152 clocks at the maximum (144 clocks for TOH +0 to 8 clocks for POH), which is within the number of processing clocks per row (270 clocks). The duration of the remaining 118 clocks is an idle span.

Overhead insertion operations will now be described more specifically with reference to FIGS. 3 and 4. First, a TOH request begins in response to an A1 byte pulse used as a frame timing pulse requesting the first byte of the frame, and subsequently, TOH is requested with fixed timing in a row. Therefore, the basic timing generator 24 generates basic timing by receiving the A1-byte frame timing pulse.

When the basic timing comes to be generated with fixed timing, the TOH input request generator 25 outputs an overhead (OH) request signal (TOHREQ) to the external device via the OR1 gate over a 144-clock span (36 bytes×8 bits/2), and simultaneously outputs an OH request signal (TOHREQ) as a data input signal to TOHFIFO 26. The TOHFIFO 26 writes the OH data (TOHD[1:0]) that has been input over an OH valid signal (TOHAV) span therein. If a basic timing is the input timing of A1 byte that is the first byte of the frame, the TOH input request generator 25 outputs a TOH framing pulse (TTOHFP). After that, when a TOH request signal is input to TOHFIFO 26 from the frame processing unit 20, TOHFIFO 26 sequentially outputs the written OH data as TOH data to the frame processing unit 20. The input from the external device and output to the frame processing unit 20 are completed within a row.

The TOH is requested with fixed timing in a row, whereas the timing for requesting POH is not fixed. This is because, as described with reference to FIG. 2, the POH J1 byte that indicates the start of the SPE 15 is designated by the pointer contained in TOH 11, and does not lie in a fixed location. This means that there is a phase difference between TOH 11 and POH 14. Therefore, the frame processing unit 20 inputs a pulse for requesting J1 byte of POH 14 to the POH framing pulse generator 29, from which a POH framing pulse (TPOHFP) is output to the external device, thereby absorbing the phase difference.

Although a POH request generated by the POH input request generator 27 to the external device via the OR1 gate is typically one byte long, when frequency is adjusted, it becomes zero to one byte long (on positive frequency justification) and one to two bytes long (on negative frequency justification). Therefore, in order for the POH data in POHFIFO28 to be constantly two bytes (the maximum number of POH requests), the POH input request generator 27 reads the number of pieces of data in the FIFO from POHFIFO 28 and requests the external device to input the required number of POH bytes via the OR1 gate. This enables frequency justification. As a result, POHFIFO 28 outputs POH data after frequency justification to the frame processing unit 20, as in the case with TOHFIFO 26.

Figure 5:
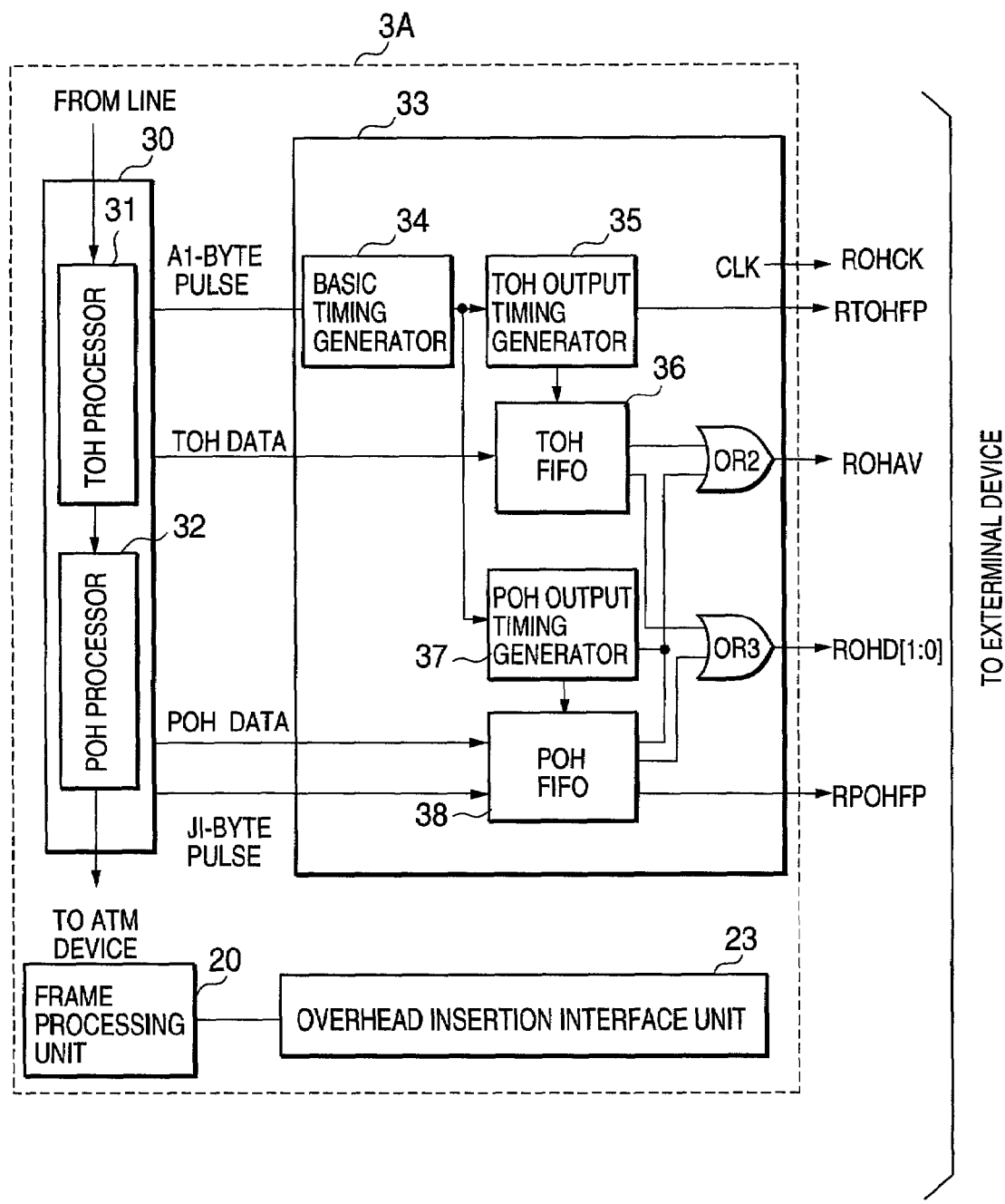
FIG. 5 is a block diagram of an interface system, mainly describing the extraction of frame overhead according to the first embodiment of the present invention.

FIG. 5 is a block diagram of an interface system for mainly describing extraction of frame overhead according to the first embodiment of the present invention. As shown in FIG. 5, an interface system 3A of this embodiment has, in addition to the frame processing unit 20 and the overhead insertion interface unit 23 that have been described with reference to FIG. 3, a frame processing unit 30 including a TOH processor 31 that performs frame processing for extracting overhead of a frame from a high-speed line and a POH processor 32; and an overhead extraction interface unit 33 that outputs extracted overhead data to a lower-speed external device.

The overhead extraction interface unit 33 in the interface system 3A includes a basic timing generator 34 that generates basic timing in response to an A1-byte pulse used as a frame timing pulse; a TOH output timing generator 35 that generates and outputs a TOH framing pulse (RTOHFP) to the external device in response to a timing signal output from the basic timing generator 34; a POH output timing generator 37 that generates output timing in response to a timing signal output from the basic timing generator 34; TOHFIFO 36 that writes TOH data received from the frame processing unit 30 in response to a timing signal output of the TOH output timing generator 35; POHFIFO 38 that receives POH data in response to a timing signal output from the POH output timing generator 37 and a J1-byte pulse used as a frame timing pulse and outputs a POH framing pulse (RPOHFP); and two OR gates (OR2 and OR3) that output a overhead valid signal (ROHAV) and overhead data (ROHD[1:0]) to the external device in response to the output of TOHFIFO 36 and POHFIFO 38. In short, for extracting overhead, the overhead extraction interface unit 33 provides a common extraction control terminal and a common extraction data terminal for transferring TOH and POH extraction control signals and extraction data to and from the external device.

The overhead extraction interface unit 33 transmits an internal operating clock (CLK) 19.44 MHz that is generated by dividing the line transmission rate 622 MHz by a factor of 32 as an overhead clock (TOHCK) to the external device.

As described above, this embodiment transmits overhead valid signals and TOH and POH data to the external device via OR2 and OR3, thereby enabling sharing of the overhead valid signal (ROHAV) terminal and the overhead data (ROHD[1:0]) terminal.

FIG. 6 is a timing diagram of various signals and data for describing overhead extraction operations in the system shown in FIG. 5. As shown in FIG. 6, an STS12c frame is transmitted at a rate of 125 μs, as in the insertion operations. As described above, assuming that the internal operating clock (TOHCK) is 19.44 MHz, one STS12c frame has to be processed in 270 clocks.

Since the overhead extracted from one frame includes 36 TOH bytes and 0 to 2 POH bytes per row, so the overhead is output from a 2-bit terminal to the external device. This makes the output timing last 152 clocks at the maximum, which is within the number of processing clocks per row (270 clocks). The duration of the remaining 118 clocks is an idle (blank) span.

Next, overhead extraction operations will be described more specifically with reference to FIGS. 5 and 6. First, the frame processing unit 30 inputs the frame timing pulse (A1-byte pulse) indicating the first byte of the frame, plus TOH data. The 36 bytes of the input TOH data are written into TOHFIFO 36 sequentially. At the same time, the basic timing generator 34 receives the frame timing pulse (A1-byte pulse) to generate basic timing.

Similarly, POH data input from the frame processing unit 30 is written into POHFIFO 38 sequentially. TOH data is input with fixed timing in a row, whereas POH data is input with unfixed timing. This is because, as described with reference to FIG. 2, J1 byte of the POH 14 that indicates the first byte of SPE 15 is designated by a pointer contained in the TOH 11, thus is not located in a fixed location. This means that there is a phase difference between TOH and POH. Therefore, writing the J1 byte pulse of the POH 14 into POHFIFO 38 and reading out the J1 byte pulse and the POH data and outputting them together to the external device make it possible to indicate that the input POH data is the J1 byte without requiring special recognition thereof, enabling the phase difference to be absorbed.

Although normally one byte of POH data is input, if frequency is adjusted, zero to one byte (on positive frequency justification) or one to two bytes of the POH data (on negative frequency justification) are input.

After the TOH data is input, when basic timing generated by the basic timing generator 34 becomes fixed timing, the TOH output timing generator 35 outputs an output timing signal over a 144-clock span (36 bytes×8 bits/2) to OHFIFO 36. This causes an OH valid signal (ROHAV) and OH data (ROHD[1:0]) to be read from TOHFIFO 36 and output to the external device via the OR gates OR2 and OR3. If basic timing output from the basic timing generator 34 is output timing of A1 byte that is the first byte of the frame, the TOH output timing generator 35 outputs a TOH framing pulse (RTOHFP) to the external device.

Furthermore, although the reading out of POH data, or POH extraction, is also performed with basic timing generated by the basic timing generator 34, the number of bytes (either of 0, 1, or 2 bytes) of POH data written in POHFIFO 38 is not obvious because the frequency is adjusted. Therefore, the POH output timing generator 37 outputs a 2-byte output timing signal to POHFIFO 38, and, if a data valid signal (ROHAV) is active (POH is available), it continues to output the output timing signal to output a data valid signal (ROHAV) and a POH framing pulse (ROHFP) to the external device. If the data valid signal (ROHAV) is not active (POH is unavailable), the POH output timing generator 37 stops outputting the output timing signal and cancels output to the external device. This enables frequency justification.

As a result, overhead read from TOHFIFO 36 and POHFIFO 38 can be output as OH data (ROHD[1:0]) to the external device. Input from the frame processing unit 30 and output to the external device are completed within one row.

The first embodiment described above has the advantage that although providing TOHFIFO and OR gates to share TOH and POH hardware adds an OH request signal terminal for adjusting the frequency in the overhead insertion interface unit, the POH clock terminal and POH data terminal can be eliminated in the overhead insertion interface unit and also in the overhead extraction interface unit.

Figure 7:
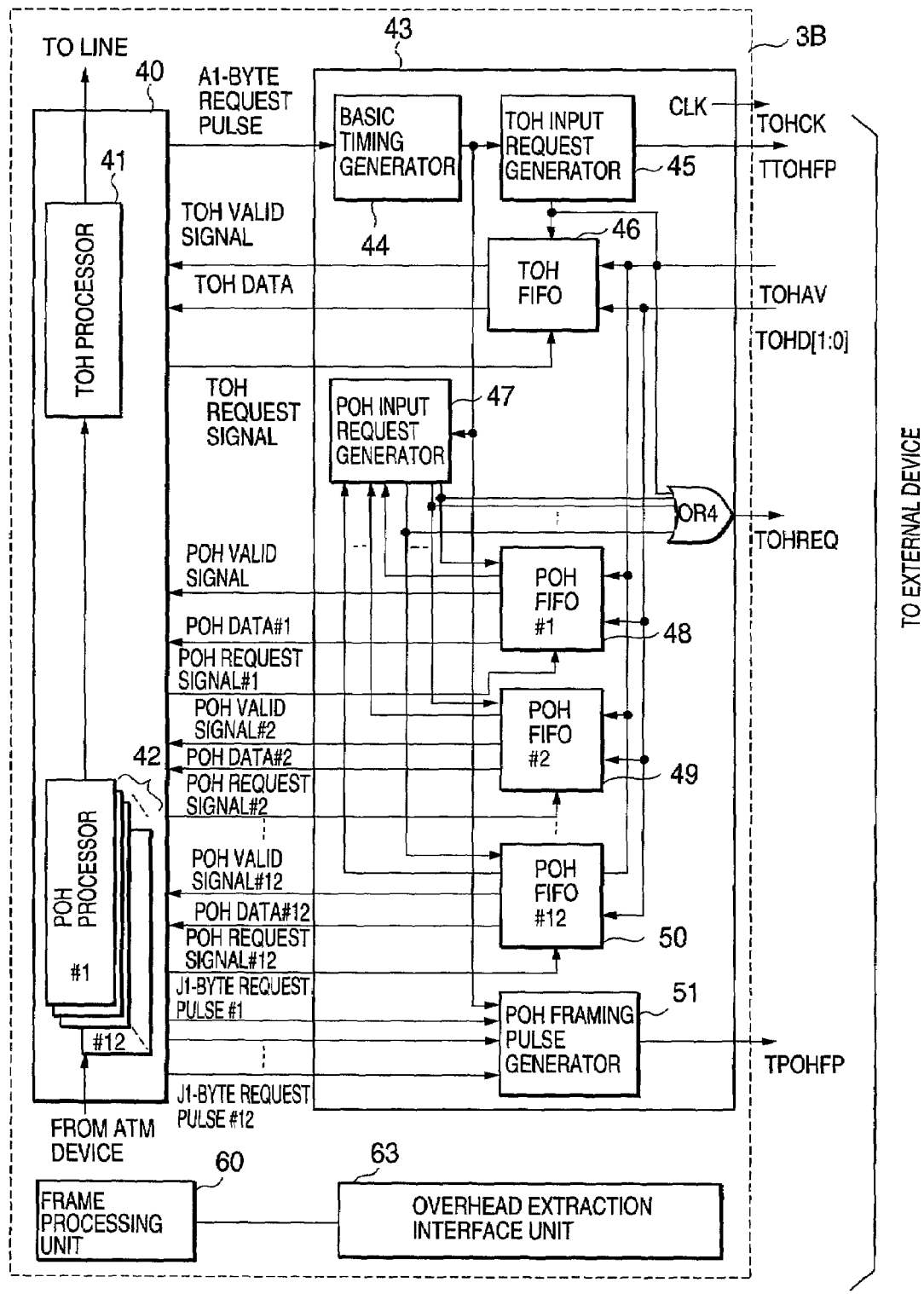
FIG. 7 is a block diagram of an interface system, mainly describing the insertion of multi-channel frame overhead according to a second embodiment of the present invention.

FIG. 7 is a block diagram of an interface system for mainly describing insertion of multi-channel frame overhead according to a second embodiment of the present invention As shown in FIG. 7, an interface system 3B is an example of an interface that performs insertion of multi-channel overhead, which has a frame processing unit 40 that includes a TOH processor 41 for processing a frame to insert overhead for a high-speed line and a plurality of POH processors (#1 to #12) 42; an overhead insertion interface unit 43 that requests overhead data for insertion of the overhead for a lower-speed external device; a frame processing unit 60 that performs processing of a frame from the high-speed line to extract overhead; and an overhead extraction interface unit 63 that requests overhead data for extracting overhead to the lower-speed external device. A description of overhead extraction will be given later with reference to FIG. 9, so overhead insertion will now be described.

The overhead insertion interface unit 43 in the interface system 3B includes a basic timing generator 44 that generates basic timing in response to an A1-byte request pulse used as a frame timing pulse; a TOH input request generator 45 that generates and outputs a TOH framing pulse to the external device with timing output from the basic timing generator 44; a POH input request generator 47 that generates an input request to the external device with timing output from the basic timing generator 44; a POH framing pulse generator 51 that generates a POH framing pulse for the external device in response to a J1 (#1 to #12) byte request pulse as a frame timing pulse and with timing output from the basic timing generator 44; an OR gate (OR4) that outputs an overhead request signal (TOHREQ) for the external device in response to an request output from either the TOH input request generator 45 or the POH input request generator 47; TOHFIFO 46 that sequentially receives an overhead valid signal (TOHAV) and overhead data (TOHD [1:0]) from the external device in response to a TOH request signal from the frame processing unit 40 and a TOH request from the TOH input request generator 45, and transfers the TOH valid signal and TOH data to the frame processing unit 40; and a plurality of POHFIFOs 48 to 50 that sequentially receive overhead valid signals (TOHAVs) and overhead data (TOHD[1:0]) from the external device in response to POH request signals (#1 to #12) from the frame processing unit 40 and a POH request from the POH input request generator 47, and transfer the POH valid signals (#1 to #12) and POH data (#1 to #12) to the POH processing unit (#1 to #12) 42 of the frame processing unit 40, respectively.

The overhead insertion interface unit 43 transmits an internal operating clock (CLK) 19.44 MHz generated by dividing the line transmission rate 622 MHz by a factor of 32 as an overhead clock (TOHCK) for the external device.

As described above, this embodiment provides the overhead insertion interface unit 43 that provides the same basic operations as those of the overhead insertion interface 23 shown in FIG. 3. More specifically, this embodiment transmits a TOH input request and a POH input request signal to the external device via OR4, thereby enabling sharing of the overhead request signal terminal, and more, provides TOHFIFO 46 and a plurality of POHFIFOs 48 to 50 to share the overhead valid signal terminal (TOHAV) and the overhead data terminal (TOHD[1:0]).

The insertion of multi-channel overhead differs from that by the overhead insertion interface 23 shown in FIG. 3 in that the processing of the POH of an STS-1 frame allocated by a time slot is performed only when the POH is inserted.

Figure 8:
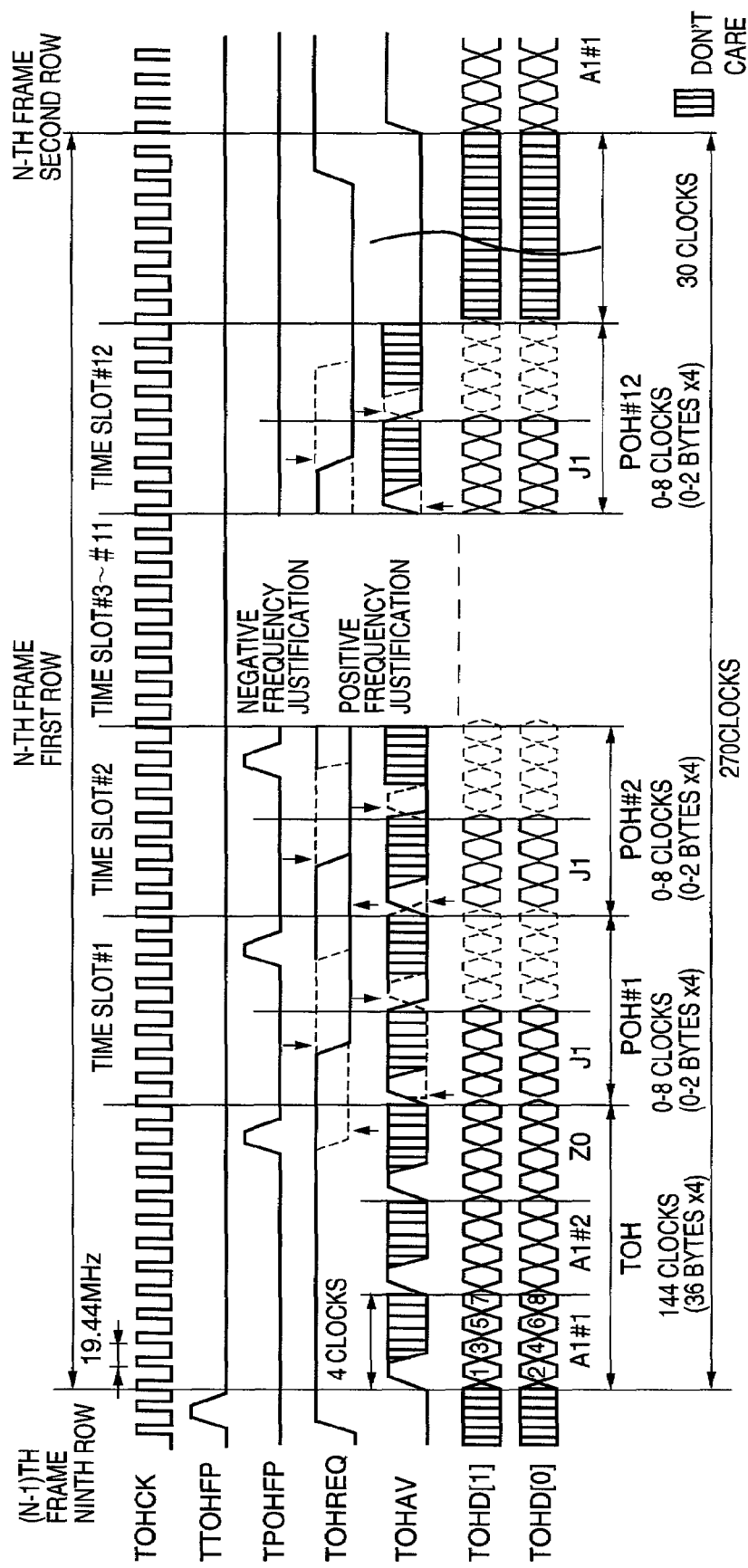
FIG. 8 is a timing diagram of various signals and data, describing multi-channel overhead insertion operations in the system shown in FIG. 7.

FIG. 8 is a timing diagram of various signals and data for describing multi-channel overhead insertion operations in the system shown in FIG. 7. As shown in FIG. 8, STS12c multi-channel processing is capable of multiplexing a maximum of 12 STS-1 frame Synchronous Payload Envelopes (SPEs) (corresponding to the SPE15 shown in FIG. 2). More specifically, POH is a sequence of maximum 12 bytes per row of the frame, and if frequency justification is taken into account, POH becomes zero to 24 bytes. Therefore, this embodiment divides 96 clocks after output of the POH into time slots #1 to #12 of 8 clocks each, and allocates POH insertion processing of multiplexed STS-1 SPE to each time slot, thereby enabling insertion of overhead in a multi-channel system. Positive and negative frequency justification in the overhead insertion interface unit 43 is performed by increasing and decreasing the number of bytes of a POH request signal in a way similar to the justification described with reference to FIG. 4.

Figure 9:
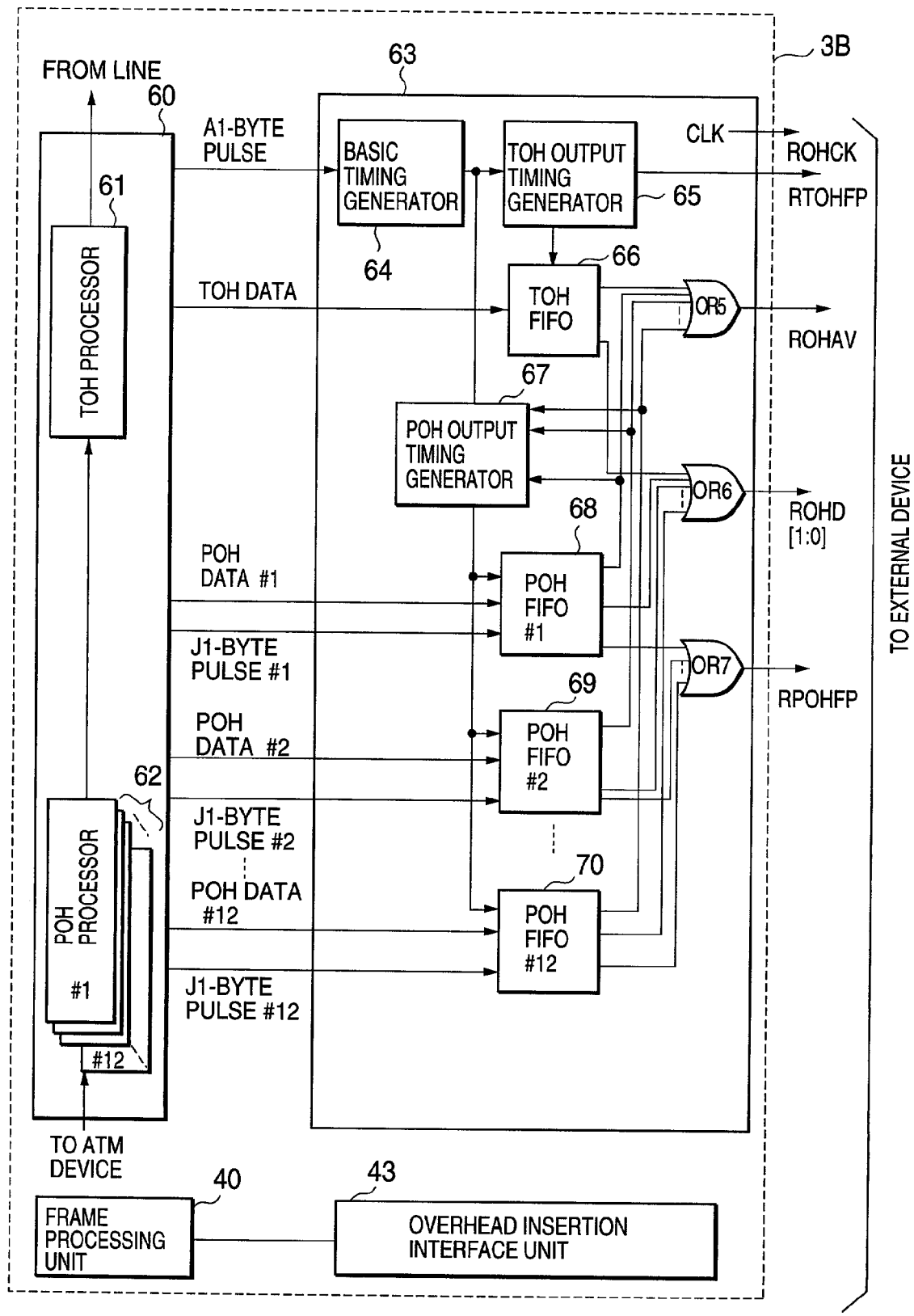
FIG. 9 is a block diagram of an interface system, mainly describing the extraction of multi-channel frame overhead according to the second embodiment of the present invention.

FIG. 9 is a block diagram of an interface system for mainly describing multi-channel overhead extraction according to the second embodiment of the present invention. As shown in FIG. 9, an interface system 3B according to this embodiment has the frame processing unit 40 and the overhead insertion interface 43 described with reference to FIG. 7, plus a frame processing unit 60 that includes a TOH processor 61 that performs frame processing for extracting overhead for a frame from a high-speed line and a plurality of POH processors (#1 to #12) 62; and an overhead extraction interface unit 63 that requests overhead data for extracting overhead to a lower-speed external device.

The overhead extraction interface unit 63 in the interface system 3B has a basic timing generator 64 that generates basic timing in response to an A1-byte pulse used as a frame timing pulse; a TOH output timing generator 65 that generates and outputs a TOH framing pulse (PTOHFP) to the external device with timing output from the basic timing generator 64; a POH output timing generator 67 that generates output timing with timing output from the basic timing generator 64; TOHFIFO 66 that writes TOH data received from the frame processing unit 60 with timing output from the TOH output timing generator 65; a plurality of POHFIFOs 68 to 70 that receive POH data (#1 to #12) with timing output from the POH output timing generator 67 and in response to the J1 (#1 to #12) byte pulses used as frame timing pulses and output POH framing pulses (RPOHFP); and three OR gates (OR5 to OR7) that output overhead valid signals (ROHAVS) and overhead data (ROHD [1:0]) in response to output of TOHFIFO 66 and POHFIFOs 68 to 70 and POH framing pulses (RPOHFPs) in response to the output of POHFIFOs 68 to 70 to the external device.

The overhead extraction interface 63 transmits an internal operating clock (CLK) 19.44 MHz by dividing the line transmission rate 622 MHz by a factor of 32 as an overhead clock (ROHCK) to the external device.

As described above, this embodiment also transmits an overhead valid signal and TOH and POH data to the external device via the OR gates OR5 to OR7, thereby enabling sharing of an overhead valid terminal (ROHAV), an overhead data terminal (ROHD[1:0]), and a POH framing pulse terminal (RPOHFP).

The extraction of multi-channel overhead differs from that by the overhead extraction interface unit 33 shown in FIG. 5 in that processing of POH of an STS-1 frame allocated by the time slot is performed only when the POH is extracted.

Figure 10:
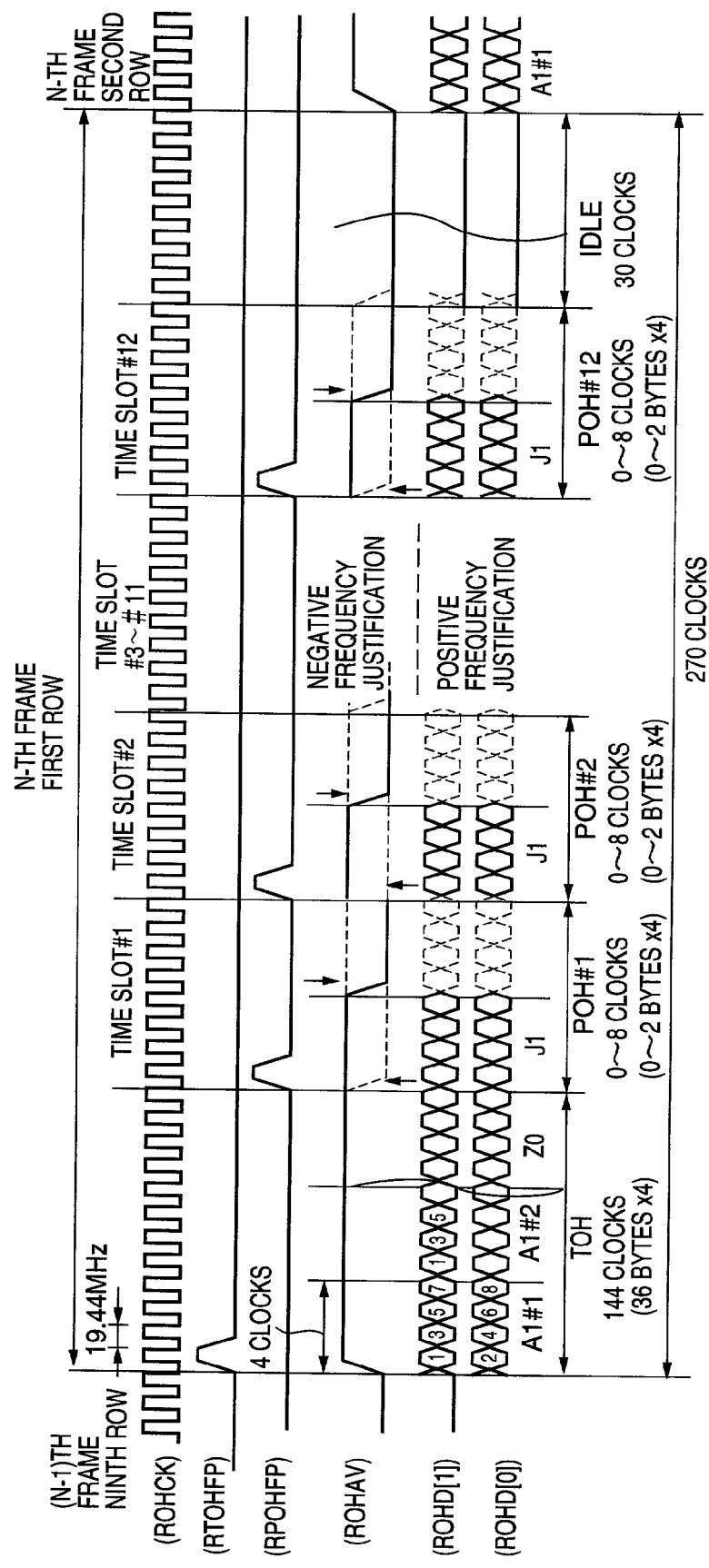
FIG. 10 is a timing diagram of various signals and data, describing multi-channel overhead extraction operations in the system shown in FIG. 9.

FIG. 10 is a timing diagram of various signals and data for describing extraction of multi-channel overhead in the system shown in FIG. 9. As shown in FIG. 10, multi-channel processing with an STS-1 frame enables multiplexing of a maximum of 12 STS-1 Synchronous Payload Envelopes (SPEs) (corresponding to SPE 15 shown in FIG. 2). More specifically, POH is a sequence of 12 bytes per row of the frame, and if frequency justification is taken into account, POH becomes zero to 24 bytes. Therefore, this embodiment divides 96 clocks after output of POH into time slots #1 to #12 of 8 clocks, and allocates POH insertion processing of multiplexed STS-1 SPE to each time slot, thereby enabling insertion of overhead in a multi-channel system. Positive and negative frequency justification in the overhead extraction interface unit 63 is performed by increasing and decreasing the number of bytes of a POH request signal in a way similar to the justification described with reference to FIG. 5.

The second embodiment described above, needless to say, requires a number of POH interfaces equal to the number of channels supported, but in addition to the advantage of the first embodiment, it has an advantage of being capable of sharing a POH interface terminal of each channel of multi-channel frames.

As described above, the SONET/SDH overhead insertion and extraction method and system of the present invention provide TOHFIFO, POHFIFO, and OR gates in the overhead insertion and extraction interface units to share TOH and POH hardware, thereby making it possible to eliminate the POH clock terminal and POH data terminal from the overhead insertion and extraction interface units, providing an effect of enabling the number of terminals per port of the LSI device to be reduced and the number of ports to be increased. In short, the present invention provides FIFO buffers for absorbing phase differences in each of the interface units, thereby enabling TOH and POH processing to be performed with the same basic timing, whereby hardware can be shared.

In addition, the present invention includes TOHFIFOs in the overhead insertion and extraction interface units, thereby providing an effect of absorbing phase differences between TOH and POH and enabling frequency justification of the overhead insertion interface unit.

Moreover, the present invention provides an effect of enabling the number of POH interface terminals per channel also to be reduced for multi-channel frames, so that the size of the LSI device can be reduced, or the number of ports increased.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A method of inserting and extracting overhead in SONET/SDH in which an interface system interfaces between each of a plurality of ports for transferring transmission frames between a high-speed line and an ATM device, and between the high-speed line and an external device that performs lower-speed processing, the interface system inserting overhead for network operation and management into the transmission frames and extracting overhead from the transmission frame, the overhead including transport overhead and path overhead with respective data and control signals, the method comprising: generating a basic timing signal based on a framing pulse; storing the transport overhead, the path overhead, and the control signals in a plurality of storing means in response to the basic timing signal; transferring the transport overhead, the path overhead, and the control signals to and from the external device; and controlling the plurality of storing means commonly, and said interface system including a first frame processing unit that is connected between the ATM device and the high-speed line and performs frame processing for inserting the overhead, and an overhead insertion interface unit that is connected between the first frame processing unit and the external device and performs transport overhead processing and path overhead processing for the insertion of the overhead.

2. A method of inserting and extracting overhead in SONET/SDH in which an interface system interfaces between each of a plurality of ports for transferring transmission frames between a high-speed line and an ATM device, and between the high-speed line and an external device that performs lower-speed processing, the interface system inserting overhead for network operation and management into the transmission frames and extracting overhead from the transmission frame, the overhead including transport overhead and path overhead with respective data and control signals, the method comprising: generating a basic timing signal based on a framing pulse; storing the transport overhead, the path overhead, and the control signals in a plurality of storing means in response to the basic timing signal; transferring the transport overhead, the path overhead, and the control signals to and from the external device; and controlling the plurality of storing means commonly, said interface system having a first frame processing unit that is connected between the ATM device and the high-speed line and performs frame processing for the insertion of the overhead, and an overhead insertion interface unit that is connected between the first frame processing unit and the external device and performs transport overhead processing and path overhead processing for the insertion of the overhead, the method including: a first step of outputting a transport overhead framing pulse and a transport overhead request signal from the overhead insertion interface unit to the external device and requesting input of the transport overhead, then storing valid signals from the external device representing the overhead and data to be inserted in a first storing means; a second step of outputting a path overhead framing pulse and a path overhead request signal from the overhead insertion interface unit to the external device and requesting input of the path overhead, then storing valid signals from the external device representing the overhead and data to be inserted in a second storing means; and a third step of outputting the valid signal and the data to be inserted that have been stored in the first and second storing means to the first frame processing unit based on a data transmission request signal transmitted from the first frame processing unit to the first and second storing means.

3. A method of inserting and extracting overhead in SONET/SDH in which an interface system interfaces between each of a plurality of ports for transferring transmission frames between a high-speed line and an ATM device, and between the high-speed line and an external device that performs lower-speed processing, the interface system inserting overhead for network operation and management into the transmission frames and extracting overhead from the transmission frame, the overhead including transport overhead and path overhead with respective data and control signals, the method comprising: generating a basic timing signal based on a framing pulse; storing the transport overhead, the path overhead, and the control signals in a plurality of storing means in response to the basic timing signal; transferring the transport overhead, the path overhead, and the control signals to and from the external device; and controlling the plurality of storing means commonly, said interface system having a first frame processing unit that is connected between the high-speed transmission line and the ATM device and performs frame processing for extraction of the overhead and an overhead extraction interface unit that is connected between the first frame processing unit and the external device and performs transport overhead processing and path overhead processing for extraction of the overhead, the method further including: a first step of storing the transport overhead data in a first storing means in the overhead extraction interface unit from the first frame processing unit; a second step of outputting a transport overhead framing pulse and an overhead valid signal, generating output timing of the transport overhead, then outputting data to be extracted from the first storing means to the external device; a third step of storing the path overhead data from the first frame processing unit in a second storing means; and a fourth step of generating output timing of the path overhead, then outputting a path overhead framing pulse and an overhead valid signal to the external device, and outputting data to be extracted from the second storing means to the external device.

4. The method of claim 2, wherein the first frame processing unit in the interface system has a plurality of path overhead processors and the second storing means in the overhead insertion interface unit is composed of a number of storing means equal to the number of the plurality of the path overhead processors, the method including inputting the transport overhead data to the first storing means in the overhead insertion interface unit from the external device, then inputting the path overhead data to the plurality of the second storing means sequentially, and performing the transport overhead request and a plurality of path overhead requests from the first frame processing unit to the overhead insertion interface unit, thereby implementing frame processing for insertion of multi-channel overhead.

5. The method of claim 3, wherein the first frame processing unit in the interface system has a plurality of path overhead processors and the second storing means in the overhead extraction interface unit is composed of a number of storing means equal to the number of the plurality of path overhead processors, the method including outputting the transport overhead data to the first storing means in the overhead extraction interface unit from the first frame processing unit, then outputting the path overhead data to the plurality of the second storing means sequentially, transmitting the transport overhead to be extracted with the output timing of the transport overhead from the overhead extraction interface unit to the external device, and then transmitting the path overhead to be extracted sequentially based on a plurality of path overhead output timings, thereby implementing frame processing of multi-channel frame overhead extraction.

6. The method of any one of claims 1 to 5, wherein each of the plurality of storing means uses FIFO memory.

7. A system for insertion and extraction of overhead in SONET/SDH having an interface system which is provided with a plurality of ports that transfer transmission frames between a high-speed transmission line and an ATM device, interfacing between the high-speed line and an external device that performs lower-speed processing; the interface system further comprising first and second frame processing units that perform frame processing for insertion and extraction of overhead; a common insertion control terminal and a common insertion data terminal for transferring transport overhead and path overhead insertion control signals and insertion data between the external device for insertion of overhead; a common extraction control terminal and a common extraction data terminal for transferring transport overhead and path overhead extraction control signal and extraction data between the external device; an overhead insertion interface unit that is connected between the first frame processing unit and the common insertion control terminal and the common insertion data terminal; and an overhead extraction interface unit that is connected between the second frame processing unit and the common extraction control terminal and the common extraction data terminal, and said first frame processing unit being connected between the ATM device and high-speed line and performing frame processing for inserting the overhead, and said overhead insertion interface unit being connected between the first frame processing unit and the external device and performing transport overhead processing and path overhead processing for the insertion of the overhead.

8. A system for insertion and extraction of overhead in SONET/SDH having an interface system which is provided with a plurality of ports that transfer transmission frames between a high-speed transmission line and an ATM device, interfacing between the high-speed line and an external device that performs lower-speed processing; the interface system further comprising first and second frame processing units that perform frame processing for insertion and extraction of overhead; a common insertion control terminal and a common insertion data terminal for transferring transport overhead and path overhead insertion control signals and insertion data between the external device for insertion of overhead; a common extraction control terminal and a common extraction data terminal for transferring transport overhead and path overhead extraction control signal and extraction data between the external device; an overhead insertion interface unit that is connected between the first frame processing unit and the common insertion control terminal and the common insertion data terminal; and an overhead extraction interface unit that is connected between the second frame processing unit and the common extraction control terminal and the common extraction data terminal, said overhead insertion interface unit comprising a basic timing generator that generates a basic timing signal in response to a framing pulse; a transport overhead input request generator that generates a transport overhead input request and a transport overhead framing pulse based on the basic timing signal to the external device; a path overhead input request generator that generates a path overhead input request based on the basic timing signal to the external device; a gate circuit that outputs each input request from the transport overhead input request generator and the path overhead input request generator via a common overhead insertion request terminal to the external device; first and second storing means for inputting and storing transport overhead and path overhead valid signals and transport overhead and path overhead data from the external device via common transport overhead and path overhead valid terminals and common transport overhead and path overhead data terminals respectively; and a path overhead framing pulse generator that generates a path overhead framing pulse in response to the basic timing signal and a J1-byte request pulse (a pulse requesting the J1 byte that indicates a location where path overhead input from the first frame processing unit begins) to the external device; wherein the data to be inserted into the transmission frame is output in response to transport overhead and path overhead request signals from the first frame processing unit to the first and second storing means.

9. The system of claim 8, wherein the overhead insertion interface unit performs positive and negative frequency justification by increasing and decreasing the number of bytes of the path overhead request signal.

10. A system for insertion and extraction of overhead in SONET/SDH having an interface system which is provided with a plurality of ports that transfer transmission frames between a high-speed transmission line and an ATM device, interfacing between the high-speed line and an external device that performs lower-speed processing; the interface system further comprising first and second frame processing units that perform frame processing for insertion and extraction of overhead; a common insertion control terminal and a common insertion data terminal for transferring transport overhead and path overhead insertion control signals and insertion data between the external device for insertion of overhead; a common extraction control terminal and a common extraction data terminal for transferring transport overhead and path overhead extraction control signal and extraction data between the external device; an overhead insertion interface unit that is connected between the first frame processing unit and the common insertion control terminal and the common insertion data terminal; and an overhead extraction interface unit that is connected between the second frame processing unit and the common extraction control terminal and the common extraction data terminal, said overhead insertion interface unit comprising a basic timing generator that generates a basic timing signal in response to a framing pulse; a transport overhead output timing generator that generates transport overhead output timing and a transport overhead framing pulse to the external device in response to the basic timing signal; a first storing means for storing transport overhead data to be extracted that is input from the second frame processing unit and inputting the transport overhead output timing from the transport overhead output timing generator; a path overhead output timing generator that generates path overhead output timing in response to the basic timing signal; a second storing means for inputting a J1-byte pulse that indicates the start position of path overhead data to be extracted and path overhead from the second frame processing unit, storing it, inputting an output timing signal from the path overhead output timing generator, and outputting a path overhead framing pulse to the external device; a first gate circuit that outputs each of output timing stored in the first and second storing means via a common overhead valid signal terminal to the external device; and a second gate circuit that outputs the transport overhead data to be extracted and the path overhead data to be extracted that have been stored in the first and second storing means via a common overhead data terminal to the external device; wherein the data to be extracted from the transmission frame is output with the output timing of each overhead to the external device.

11. The system of claim 10, wherein the overhead extraction interface unit performs positive and negative frequency justification by increasing and decreasing the number of bytes of the path overhead valid signal.

12. The system of either claim 7 or 8, wherein the first frame processing unit in the interface system has a transport overhead processor and a plurality of path overhead processors, the overhead insertion interface unit comprises a basic timing generator that generates a basic timing signal in response to a framing pulse; a transport overhead input request generator that generates a transport overhead input request and a transport overhead framing pulse to the external device in response to the basic timing signal; a path overhead input request generator that generates a number of path overhead input requests equal to the number of the plurality of path overhead processors in response to the basic timing signal to the external device; a gate circuit that outputs each input request from the transport overhead input request generator and the path overhead input request generator via a common overhead insertion request terminal to the external device; a first storing means and a number of second storing means equal to the number of the plurality of path overhead processors, for receiving and storing a overhead valid signal and overhead data from the external device; and a path overhead framing pulse generator that generates a path overhead framing pulse to the external device in response to the basic timing signal and a number of J1-byte request pulses (pulses indicate the start position of path overhead input from the first frame processor) equal to the number of the plurality of path overhead processors; wherein the transport overhead request and a plurality of path overhead requests are output to the overhead insertion interface unit from the first frame processing unit, thereby multiplexing insertion of the path overhead into the transmission frame and implementing multiplexed frame processing of multi-channel overhead insertion.

13. The system of claim 12, wherein the overhead insertion interface unit performs positive and negative frequency justification by increasing and decreasing the number of bytes of the path overhead request signal.

14. The system of either claim 7 or 10, wherein the second frame processing unit in the interface system has a transport overhead processor and a plurality of path overhead processors, and the overhead extraction interface unit includes: a basic timing generator that generates a basic timing signal in response to a framing pulse; a transport overhead output timing generator that generates transport overhead output timing and a transport overhead framing pulse to the external device in response to the basic timing signal; a first storing means for receiving transport, overhead data to be extracted from the second frame processing unit, and receiving and storing the transport overhead output timing from the transport overhead output timing generator; a path overhead output timing generator that generates path overhead output timing in response to the basic timing signal; the plurality of the second storing means for receiving a number of path overhead data to be extracted equal to the number of the plurality of path overhead processors J1-byte pulses indicating the starting positions of their path overheads from the second frame processing unit, and receiving and storing an output timing signal from the path overhead output timing generator; a first gate circuit that outputs each of output timing that has been stored in the first storing means and the plurality of the second storing means via a common overhead valid signal terminal to the external device; and a second gate circuit that outputs the plurality of J1-byte pulses that have been stored in the plurality of the second storing means respectively via a common overhead data terminal to the external device; wherein the plurality of J1-byte pulses are output from the second frame processing unit to the plurality of the second storing means in the overhead extraction interface unit, thereby multiplexing extraction of overhead from the transmission frame and implementing multiplexed frame processing of multi-channel overhead extraction.

15. The system of claim 14, wherein the overhead extraction interface unit performs positive and negative frequency justification by increasing and decreasing the number of bytes of the path overhead request signal.

16. The system of any one of claims 7, 8, and 10, wherein each of the first and second storing means uses FIFO memory.

* * * * *